United States Patent
Neskovic (10) Patent No.: US 12,556,423 B2
(45) Date of Patent: Feb. 17, 2026

(54) METHOD FOR COLLECTING AND REPORTING FEEDBACK FOR A PRESENTATION

(71) Applicant: Predrag Neskovic, Washington, DC (US)

(72) Inventor: Predrag Neskovic, Washington, DC (US)

( * ) Notice: Subject to any disclaimer, the term of this patent is extended or adjusted under 35 U.S.C. 154(b) by 15 days.

(21) Appl. No.: 18/601,735

(22) Filed: Mar. 11, 2024

(65) Prior Publication Data
US 2024/0305493 A1    Sep. 12, 2024

Related U.S. Application Data

(60) Provisional application No. 63/451,632, filed on Mar. 12, 2023.

(51) Int. Cl.
*H04L 12/18*    (2006.01)

(52) U.S. Cl.
CPC ................ *H04L 12/1831* (2013.01)

(58) Field of Classification Search
CPC ............. H04L 12/1822; H04L 12/1831; H04L 12/1813
USPC ........................................................ 709/204
See application file for complete search history.

(56) References Cited

U.S. PATENT DOCUMENTS

| | | | |
|---|---|---|---|
| 5,226,177 A | 7/1993 | Nickerson | |
| 5,537,618 A | 7/1996 | Boulton et al. | |
| 9,489,855 B2 | 11/2016 | Beavers et al. | |
| 9,912,801 B1 | 3/2018 | Adkins | |
| 10,200,468 B2 | 2/2019 | Leban et al. | |
| 10,885,499 B2 * | 1/2021 | Inoue | G06Q 10/1097 |
| 11,374,989 B1 | 6/2022 | Martin | |
| 11,501,261 B1 * | 11/2022 | Schemers | H04L 51/08 |
| 2004/0237032 A1 | 11/2004 | Miele et al. | |
| 2006/0106872 A1 | 5/2006 | Leban et al. | |
| 2006/0294552 A1 | 12/2006 | Swanson et al. | |
| 2011/0295392 A1 * | 12/2011 | Cunnington | G06Q 10/10 702/19 |
| 2012/0164619 A1 | 6/2012 | Meer | |

(Continued)

FOREIGN PATENT DOCUMENTS

| | | |
|---|---|---|
| WO | 0153922 A2 | 7/2001 |
| WO | 03094020 A1 | 11/2003 |

(Continued)

*Primary Examiner* — Ruolei Zong
(74) *Attorney, Agent, or Firm* — KARCESKI IP LAW, PLLC (57) ABSTRACT

A method for collecting feedback from at least one participant during a presentation and for providing the feedback to a first presenter includes, by a data processing unit connected to at least one participant device associated with the at least one participant, setting a time increment for collecting feedback from the at least one participant. At each time increment, feedback that is provided by the at least one participant via the at least one participant device is collected by the data processing unit. The feedback provided by the at least one participant is then associated with each time increment by the data processing unit. The data processing unit stores the feedback in a database connected to the data processing unit. The feedback is presented, via at least one presenter device associated with the presenter, to the first presenter.

19 Claims, 10 Drawing Sheets

(56) References Cited

U.S. PATENT DOCUMENTS

| | | |
|---|---|---|
| 2013/0164725 A1 | 6/2013 | Robbins et al. |
| 2013/0280689 A1 | 10/2013 | Meer |
| 2014/0123014 A1* | 5/2014 | Keen .................... H04L 51/046 |
| | | 715/719 |
| 2014/0234824 A1 | 8/2014 | Schepman et al. |
| 2016/0011729 A1 | 1/2016 | Flores et al. |
| 2016/0300135 A1* | 10/2016 | Moudy .................. G06Q 50/20 |
| 2019/0066664 A1* | 2/2019 | Miller ................... G10L 19/018 |
| 2019/0349212 A1* | 11/2019 | Heins .................. H04L 12/1831 |
| 2022/0122570 A1* | 4/2022 | Malachi ............... G06Q 20/384 |
| 2022/0139056 A1 | 5/2022 | Fieldman |
| 2023/0033852 A1* | 2/2023 | Avrunin ................. G10L 25/57 |
| 2023/0154446 A1 | 5/2023 | Herz |
| 2024/0022793 A1* | 1/2024 | Silverstein ......... G06Q 20/3678 |

FOREIGN PATENT DOCUMENTS

| | | | |
|---|---|---|---|
| WO | 2010105115 A2 | 9/2010 | |
| WO | WO-2017156995 A1 * | 9/2017 | ............. G06F 16/00 |

\* cited by examiner

METHOD FOR COLLECTING AND REPORTING FEEDBACK FOR A PRESENTATION

CROSS-REFERENCE TO RELATED APPLICATION(S)

This United States Non-Provisional Patent Application relies on and claimed priority to U.S. Provisional Patent Application Ser. No. 63/451,632, filed on Mar. 12, 2023, the entire contents of which is incorporated herein by reference.

FIELD OF INVENTION

The present invention is related to a system and method for improving communication among the participants in various gatherings such as meetings and in general to providing anonymous feedback to the presenter and presented material.

BACKGROUND OF THE INVENTION

The parameters associated with meetings between an organizer and participants are well known. For example, in the case of classroom interaction, the organizer is a teacher, and the participants are the students. In the case of the corporate meeting, the organizer is a host of the meeting, and the participants are the employees. In the case of the town hall meeting, the organizer is the host, and the participants are the citizens. In the case of the conference meeting, the organizer is a presenter, and the participants are the attendees.

Efficient communication among meeting participants is essential for successful meetings. That communication can be conducted in various ways such as by raising hands and asking questions (in in-person environments), or by posting online questions or using reaction icons (in online environments). Raising hands and asking questions when the number of participants is large (e.g., in meetings that have several hundreds of in-person participants) is obviously not efficient. In the online setting, that is not a significant problem. Feedback, in the form of thumbs up/down, likes, and various emojis is commonly used in platforms such as Zoom, Viber, Slack, Google, Teams meetings, and many other. While feedback can provide valuable information, feedback information is generally shared among all the participants, and some participants are not comfortable with that option and prefer to keep feedback that they receive from other participants private.

One challenge in the current meeting environment is how to take advantage of methods that have been developed for online communication, such as the benefits of real-time feedback and large-scale participation, and adapt them to in-person environments. In in-person environments the use of electronics such as computers, tablets and smart phones is generally discouraged since their use can be disruptive. The challenge for the participants (e.g., the audience) is how to use the electronics to provide feedback while still focusing attention on the speaker and the material that is being presented, and the challenge for the presenter is how to receive and integrate participants' feedback so that it is minimally interrupting the presentation.

Numerous methods have been developed to address these questions in the classroom and conference environments. These include methods are used in platforms and apps like Canvas, Piazza, GoSoapBox, Vevox, Kahoot, Pool Everywhere, Acadly, Conferences i/o, and prior art including US9912801B1, US20060294552A1, US20130164725A1, US20130280689A1 to mention a few. Many current solutions are extensions or variants on the clickers or iClickers (based on Bedford, Freeman & Worth Publishing Group, LLC, the ICLICKER trademark) and the like. iClicker is an interactive response system that allows participants to provide predetermined responses to polls, quizzes, and multiple-choice questions.

A significant problem with these methods is that they are one directional: a teacher solicits a question and receives a response from the audience. For example, U.S. Pat. No. 9,489,855B2 discloses a method wherein a teacher may receive student feedback in response to presentation of the poll, and WO2010105115A2 allows the instructor to ask open-ended questions, and students may respond with free-text answers. These and similar technologies, however, cannot be used by students to provide feedback when they (students) have a need, for example when they don't understand the material. For example, in large classrooms, it is very difficult for a teacher to assess whether students understand the material that is being presented. Continuously administering quizzes or polls could help but that approach is very disruptive. Similarly, solutions that allow participants to ask questions through the platform during the lectures are also disruptive, especially in large classes. What is needed is a method that is non-disruptive, simple to use, continuously collect feedback, and provides real-time information to presenters. Furthermore, to encourage honest responses, the method should allow anonymous feedback.

Using feedback in standard meetings, such as business or town-hall meetings, is probably the most challenging since every participant can, at some point, become a speaker and any interface that is used would have to be bi-directional. Therefore, all the methods that provide a presenter with the interface that can only be used to request feedback, and participants with the interface that only provides responses, are not applicable in this context. This includes all the methods where a presenter can generate a poll, or a quiz and participants use an interface to provide feedback. What is needed is an interface that can be used both for sending and receiving feedback.

There are many prior art systems for opinion gathering that are not directly addressing meetings but instead address viewer reactions to media streams such as live television programs or pre-recorded videos. However, they are informative, describe relevant methods and therefore are briefly reviewed here. For example, WO2001053922A2 discloses a system to collect, analyze and report real-time opinion data regarding a variety of media events. A media management server streams the live or on-demand events to participants over a computer network. Each participant then provides an opinion about the media stream and that information is sent back to the management server. Unfortunately, this approach cannot be used within a standard meeting setting where each participant can become a presenter. In addition, the approach does not provide a method for transferring feedback information from the media server to the presenter in a manner that is not disruptive. U.S. Pat. No. 5,226,177A discloses a real-time system for presenting question to the audience, collecting answers or votes, and reporting polling results. The responses of the audience are then sent to the base station. The limitation of this system is that the audience can provide responses only when solicited as opposed to providing feedback at any time during the event.

A method for managing user responses to live multimedia broadcast is disclosed in WO2003094020A1. The method can be used to collect and manage responses from the users to the media stream, and as such cannot be used to collect and manage audience responses to the speaker during in-person meetings where no media is used, and the speaker is just talking to the audience.

A method disclosed in U.S. Pat. No. 5,537,618A, can be used in the classroom settings. It consists of a feedback interface that collects feedback from a user, and a feedback viewing interface that is used by the reviewer. Although this approach goes beyond one-directional technologies (such as those that solicit feedback), it is not a real-time system. Every feedback is stored in a feedback record and is preferably stored on a database with other feedback records, which are then read from the database and presented to the reviewer. Furthermore, the method cannot be used in standard meetings since it has two different interfaces (for the reviewer and for the participants) as opposed to having one dual purpose interface that can be used both for providing and receiving feedback.

US20160011729A1 discloses a system and method that utilizes audience responses in order to enhance presentation content. Unfortunately, the system is divided into a presenter component and audience manager component and as such cannot be used in standard meetings where every participant (audience member) can become a presenter and thus needs an interface that can both provide feedback and collect feedback from other participants.

One of the challenges related to standard meetings is who decides who should be allowed to speak (the next speaker), and who decides what should be on the meeting agenda. Currently, and in most cases, the person that selects the speaker during the meeting is the organizer or the host of the meeting. This option can be biased in situations where the meetings take place in hierarchical organizations and the organizer is at the higher level compared to participant and, thus, exerts greater power in choosing the speaker compared to other participants. Similarly, in many institutions, it is difficult for the participants to propose agenda items due to various peer and hierarchical pressures. US20060106872A1 discloses a computer-implemented agenda tool that actively manages a meeting by responding to status changes, scheduling follow-ups, and providing ready access collateral content. However, the invention does not provide a method that would allow participants to anonymously select agenda items. What is needed is a method that allows participants to choose the next speaker and propose agenda items collectively and anonymously.

Another challenge related to standard meetings is that the person that is speaking often does not receive real-time feedback from the audience. This is especially the case when the audience is large or when the material being presented is contentious. As a consequence, a speaker sometimes continues to speak even though most participants prefer that the speaker stops speaking; or the speaker stops speaking even though the majority would prefer that the speaker continues. The lack of honest and real-time feedback sometime results in a meeting where a few participants take over the meeting despite the fact that the majority of the participants do not agree with them. This results in meetings that are not efficient, productive, and effective. What is needed is a method that allows participants to provide honest (anonymous) feedback to the presenter while the presenter is speaking and without disrupting the meeting.

In many cases, presenters use videos as part of their presentations or record their presentations and allow participants to view them after the presentation is over. There are many methods and platforms that allow users to provide feedback to video presentations. Some include instant reactions (e.g., thumbs up/down, etc.) and some allow the users to provide annotations, US20040237032A1. While a detailed annotation provides more information compared to simple emoji reactions, it also requires more time from the user, and it is a challenge to devise incentives to engage participants to provide detailed annotations. Even if the participants are incentivized to provide annotation, it is not clear how to combine and analyze annotations from multiple users and provide guidance to presenters as to how to improve their presentations based on the annotations. What is needed is a feedback interface that is simple to use by the participants and can provide feedback information that is simple to analyze and provide clear guidance to presenters as to how to improve their presentations.

These deficiencies in the prior art seek a solution not otherwise available in the prior art, as discussed above.

SUMMARY OF THE INVENTION

The present invention addresses the problems in the prior art by providing, inter alia, a method and a system for implementing participants' feedback and sharing it with other participants anonymously and in real-time.

A feedback interface of the present invention is used not only to provide feedback from a user but to also receive feedback from other users.

Every participant, when in the role of the presenter/speaker, may choose whether feedback received from other participants should be public (that every participant sees it), or private (only the person who is presenting can see feedback from other participants).

The present invention also is directed to a method for participants to anonymously select the next speaker during the meeting, and to anonymously select the items that should be included in the agenda.

In addition, the invention discloses a method for integrating feedback from participants that watched a video. Integrated feedback can be used by the presenter to easily find sections of the video that can be improved, and they can be used by students (in the classroom setting) for peer learning.

According to one embodiment, the present invention provides a method for collecting feedback from at least one participant during a presentation and for providing the feedback to a first presenter. The method includes, by a data processing unit connected to at least one participant device associated with the at least one participant, setting a time increment for collecting feedback from the at least one participant. At each time increment, feedback that is provided by the at least one participant via the at least one participant device is collected by the data processing unit. The feedback provided by the at least one participant is then associated with each time increment by the data processing unit. The data processing unit stores the feedback in a database connected to the data processing unit. The feedback is presented, via at least one presenter device associated with the presenter, to the first presenter.

In this method, the at least one participant is understood to encompass a plurality of participants.

Similarly, the at least one participant device is understood to encompass a plurality of participant devices.

Still further, the at least one participant device is understood to be one of a computer, cellular telephone, or other mobile computing device.

Similarly, the at least one presenter device is understood to be one of a computer, cellular telephone, or other mobile computing device.

In the method, it is contemplated that the at least one participant device is connected wirelessly to the data processing unit.

In addition, for the method, the at least one presenter device also is contemplated to be connected wirelessly to the data processing unit.

The method of the present invention also may include presenting the feedback to the presenter in real time, during the presentation.

In addition, the method may include presenting a summary of the feedback to the presenter after the termination of the presentation. Here, the summary may include a histogram tabulating the feedback collected at each time increment.

In another contemplated embodiment, the time increment is a predetermined time period. Here, the predetermined time period is contemplated to be at least one second.

In another contemplated embodiment, it is contemplated that the presentation includes a plurality of visual materials, presented serially, and that the time increment begins at a start of a display of each visual material from the plurality of visual materials. If so, the plurality of visual materials may be a plurality of slides and/or videos.

It is also contemplated that the method includes collecting, from the at least one participant device via the data processing unit, second presenter input, identifying a second presenter, and by the data processing unit, changing the first presenter to the second presenter.

Alternatively, the method also may include collecting, from the at least one participant device via the data processing unit, second topic input, identifying a second topic, and by the data processing unit, sending the second topic input to the first presenter.

The method of the present invention is contemplated to operate where an identity of the at least one participant is anonymous.

Other aspects of the present invention will be made apparent from the discussion herein.

DETAILED DESCRIPTION OF EMBODIMENT(S) OF THE INVENTION

The invention concerns two entities: the organizer and the participants. In most cases, such as in the classroom setting, the organizer is a presenter. However, in some other settings, such as in the town-hall meeting, every participant can at some point become a presenter, or a speaker. Both the organizer and the participants are referred to as "users" herein.

The invention contemplates that every user has a computational device, such as a smart phone, and that the user's device is able to communicate with devices of other users through the Internet or Bluetooth or Wi-Fi or similar wireless connections.

The invention can be implemented in various embodiments, such as a platform or an application (an app). If implemented as a platform, the invention can be used through any of the browsers, such as Chrome, Firefox, Safari, Edge, and etc. If implemented as an app, every user would have to download it on their computer, phone, tablet, and etc. Without the loss of generality, the invention may be as implemented as a platform. That means that all the users are given a web link (a site) that they enter into their devices.

Figure 1:
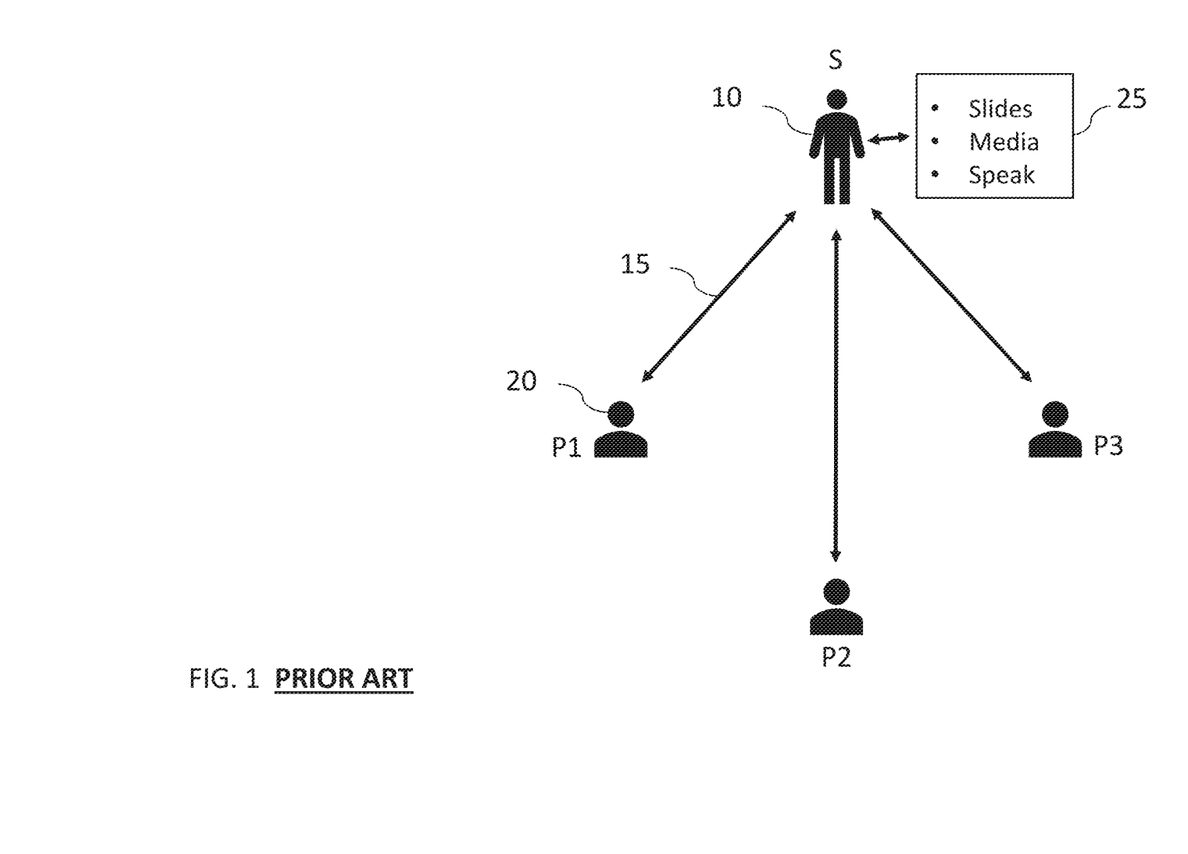
FIG. 1 is a graphical representation of an arrangement of participants during presentation, which is being made according to the prior art.

FIG. 1 depicts the prior art, in which includes a regular meeting where a presenter, 10, communicates to the participants using one of the modalities including slides, media (such as video), or directly speaking to the participants. A participant in turn communicates to the presenter in a similar manner by engaging in in-person communication, e.g., asking in-person questions and etc.

Figure 2:
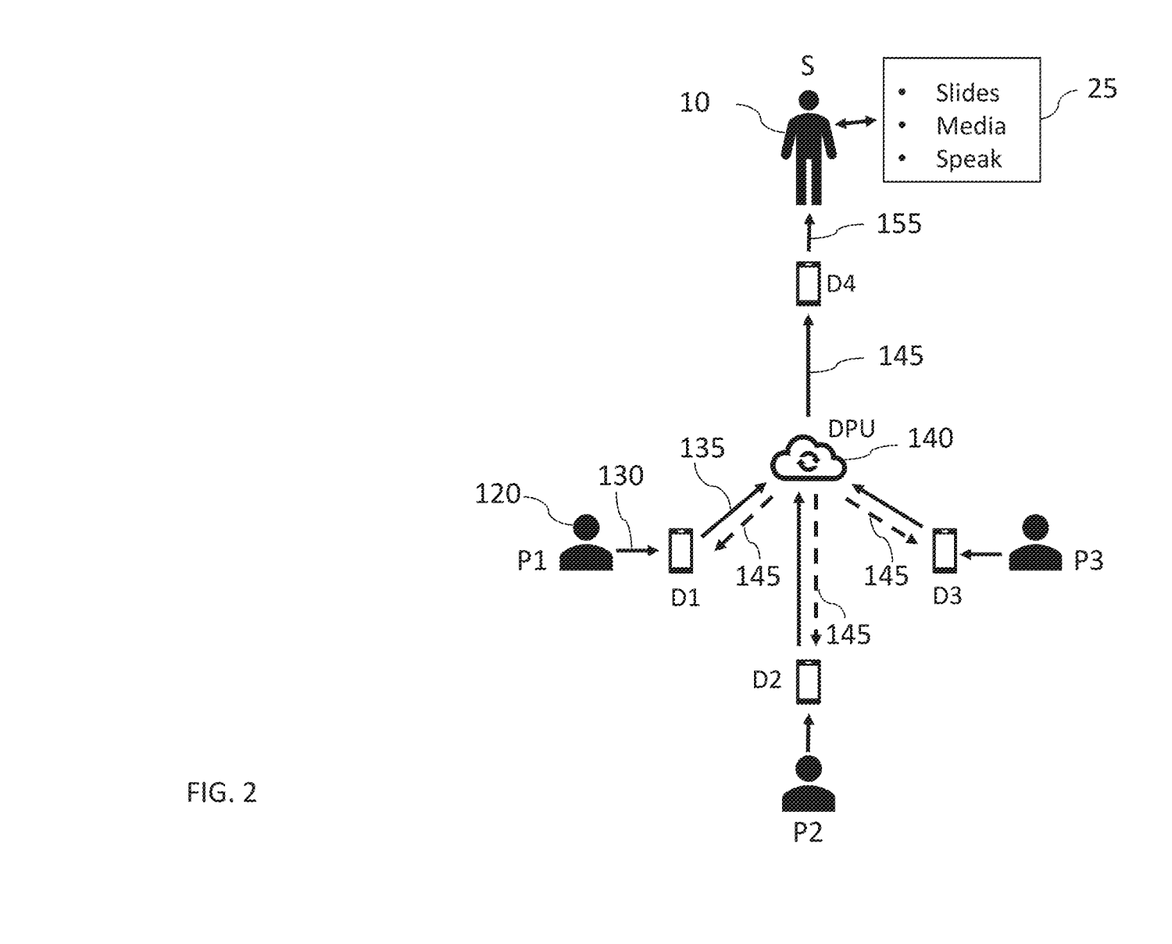
FIG. 2 is a graphical representation of an arrangement of participants during presentation, which is being made according to the present invention.

FIG. 2 depicts a specific embodiment of the present invention in which a presenter, 10, communicates to the participants using one of the modalities including slides, media (such as video), or directly speaking to the participants and the participants provide feedback to the presenter in real-time using their devices. Importantly, this communication can be done in parallel to the communication described in FIG. 1. In this example, a meeting consists of the presenter, 10, and three participants P1, P2, and P3. However, the number of participants can be much larger. The participants communicate their preferences through devices D1, D2 and D3 to the Data Processing Unit (DPU), 140. The data processing unit also is referred to herein as the "data processor." The data processor may be any suitable device, including a computer, that incorporates a processor and is capable of executing code, including software. The processor may be of any type known to those skilled in the art. The DPU integrates and processes data from all the participants and outputs, 145, the processed data to the presenter, 155, thorough presenter's device D4. For example, the participant P1, uses the device D1 to input preferences, 130, using an interface such as one of those presented in FIG. 3. The output from the device D1, 135, is then transmitted to the DPU, 140, for further processing. The processed information, 145, that is sent to the presenter can for example include integrated feedback from all the participants whether for example they agree with presenter's statement, and that information, 145, can be optionally distributed to all the participants as well.

The present invention discloses a method for communication that is in contrast to Zoom and similar communication systems that operate only on one level. Although Zoom and similar systems can operate in hybrid environments that combine online and in-person audiences, only online participants can provide feedback and in-person participants can provide feedback only if using a camera and the microphone of the online participant.

The present invention discloses a method for communication that is also in contrast to various existing systems that are used in classroom or conference environments such as Piazza, Canvas, Vevox, Polls.io, etc. To engage with the audience, the existing systems have to switch from in-person to online communication and thus interrupt the flow of communication. In contrast, the current invention does not have to switch between the different modes of communication and instead seamlessly combines them.

Figure 3:
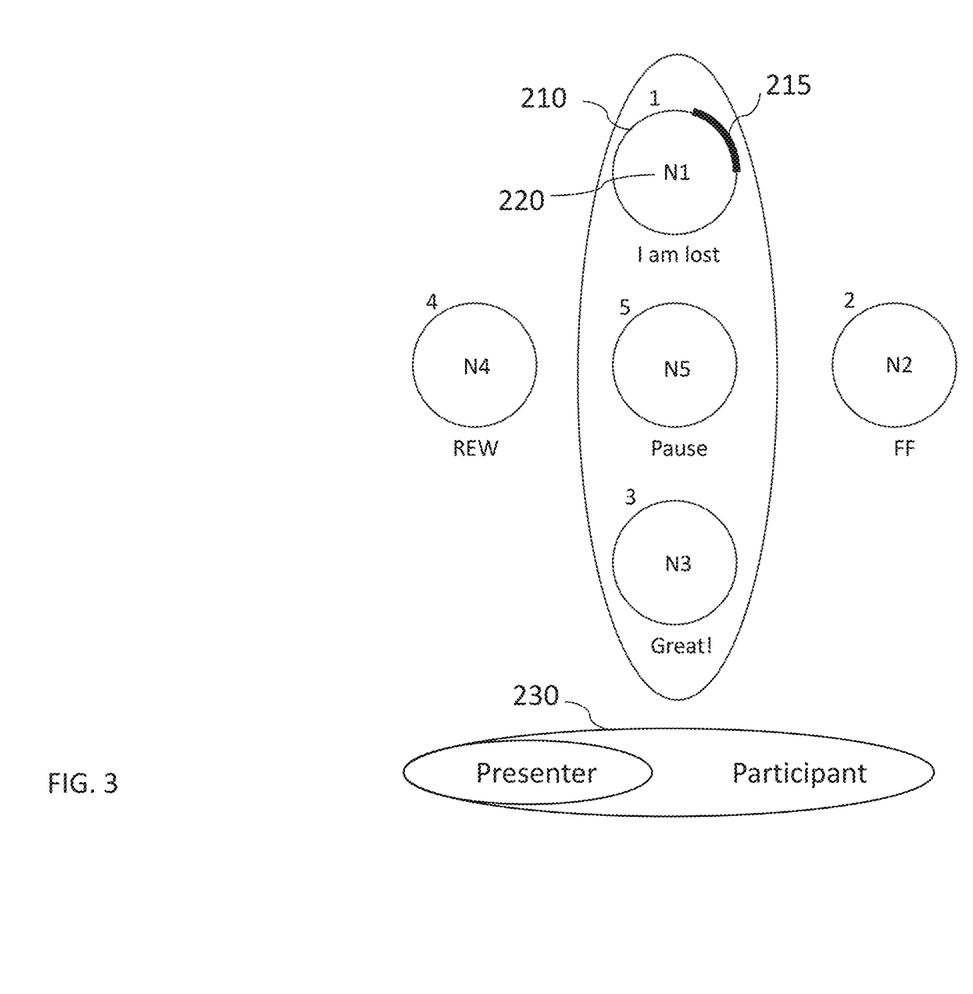
FIG. 3 is a graphical representation of an interface permitting participants to provide feedback to a presenter in real time.
Figure 9:
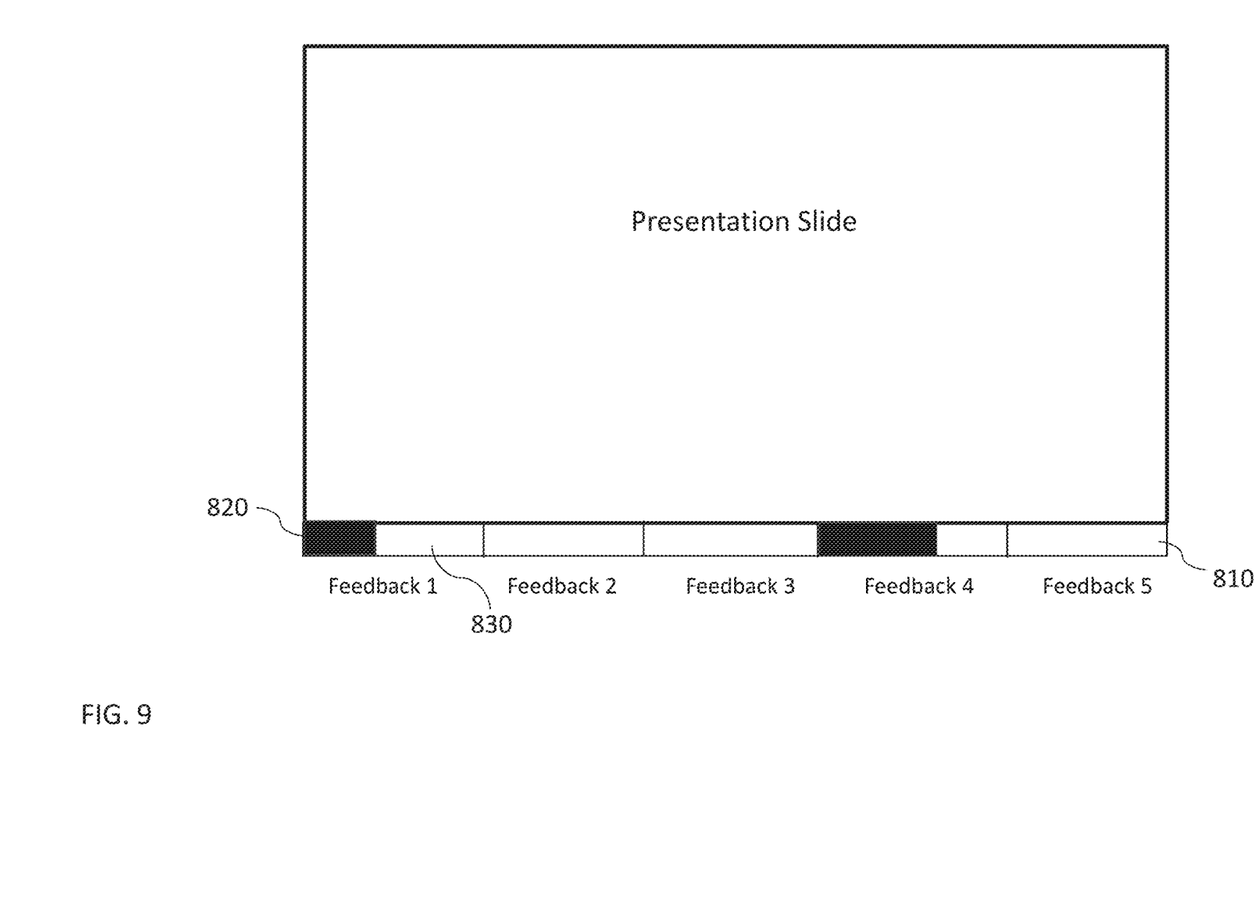
FIG. 9 is a graphical representation, illustrating one contemplated format for presenting feedback to a presenter.

During a meeting, every participant can become a presenter and when the user's device is in the presenter's mode, FIG. 3 230, the device obtains feedback from other participants. For the presenter, feedback is minimally disruptive and can be delivered in different ways. For example, if the presenter is using slides, feedback, FIG. 2 155, can be imbedded into each slide, as depicted in FIG. 9, so that the presenter does not have to exit the presentation in order to check audience's responses. If the presenter is not using slides but instead just speaking, feedback, 155, can be delivered visually on the computer, smart phone, tablet, or smart watch. Feedback can also be delivered in the audio form using for example headphones or earphones, or in the form of the haptic feedback.

Every participant, when in the role of the presenter/speaker, can choose whether feedback received from other participants should be public (so that every participant can see it), or private (only the person who is presenting can see feedback from other participants). For example, if the presenter allows feedback to be public, then the participant P1, 120, would receive processed information, 145, from the DPU, 140. On the other hand, if the presenter chooses private feedback, then the participant P1, 120, would only be able to provide feedback, 135, but not to receive processed information, 145, from the DPU, 140.

Figure 4:
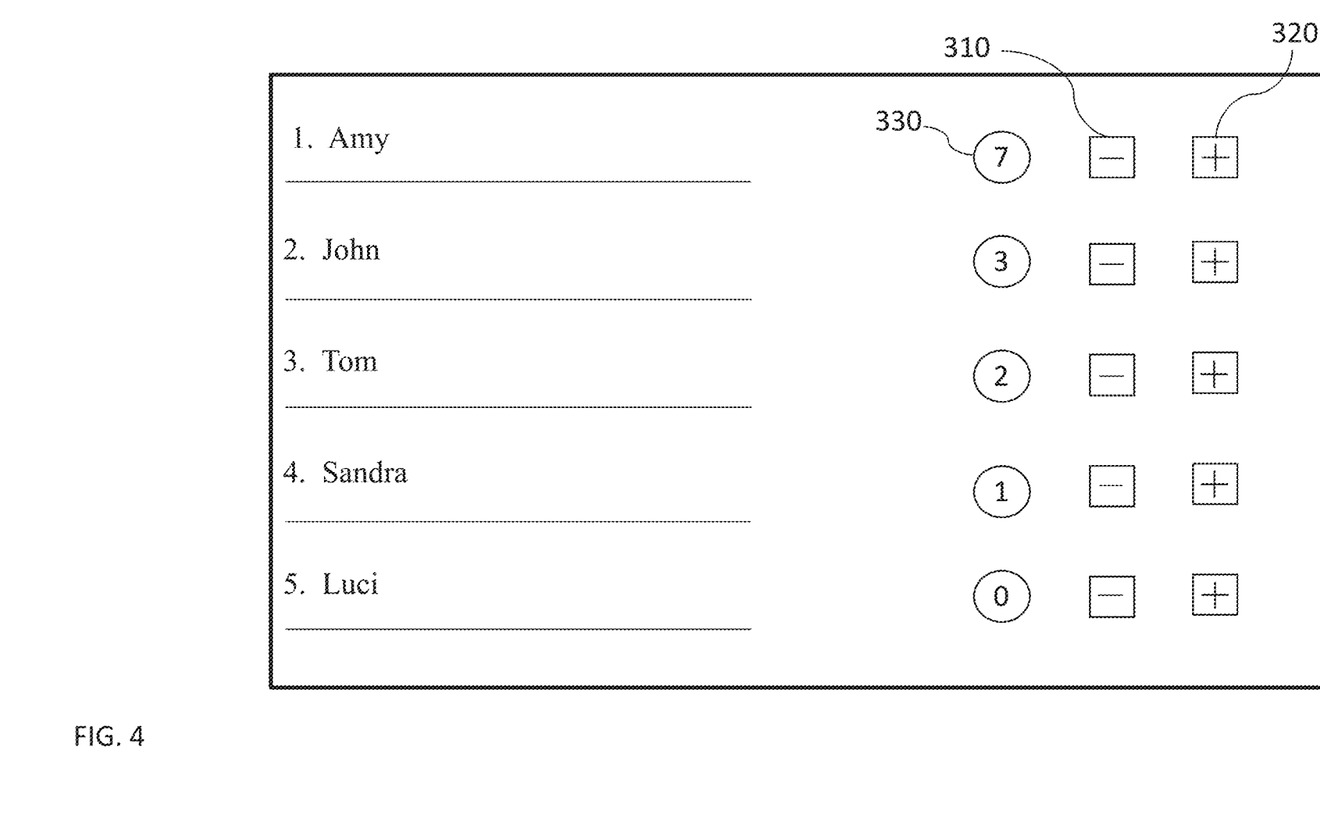
FIG. 4 is a graphical representation of an interface whereby participants in the presentation may select the next speaker for the presentation.
Figure 5:
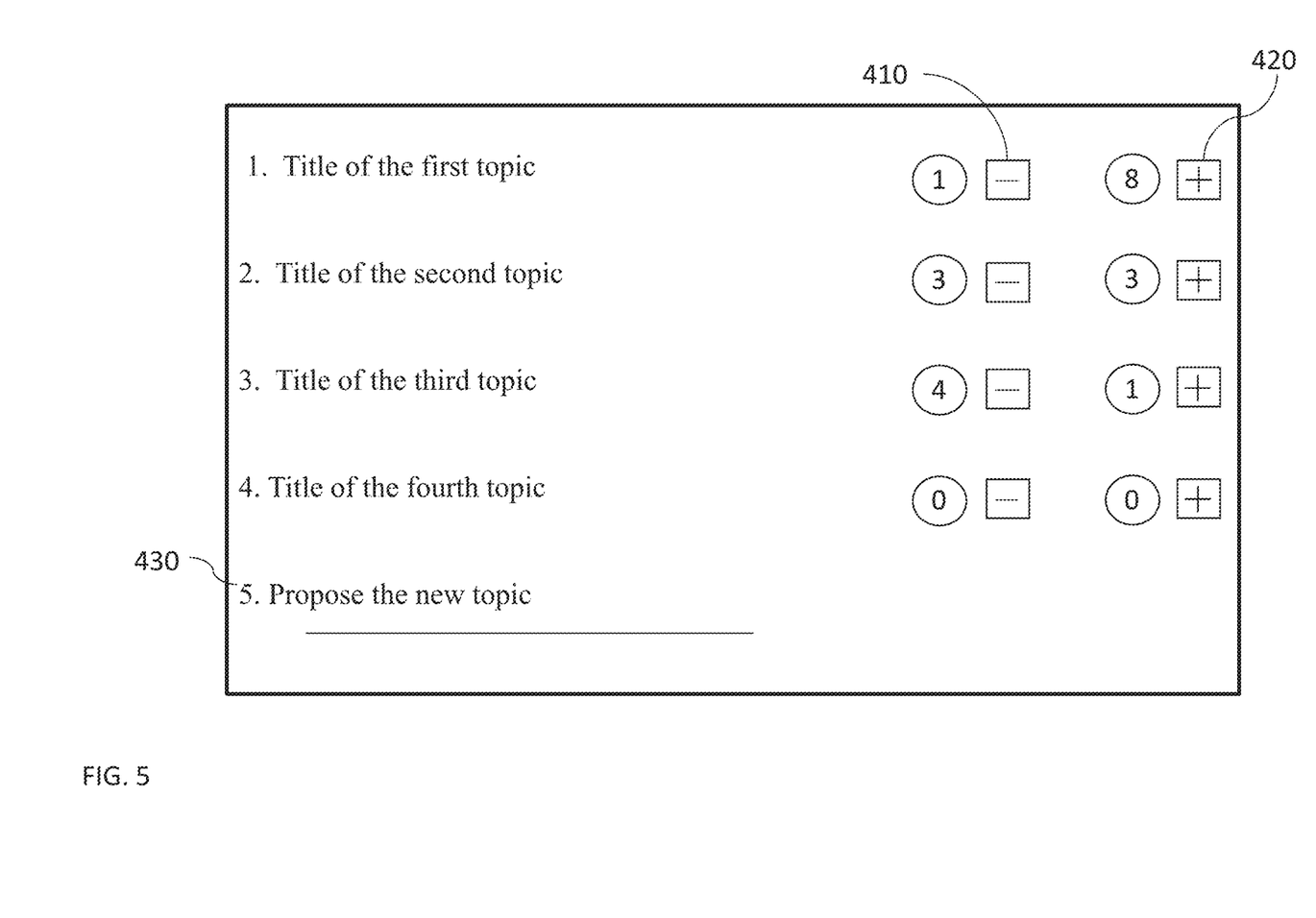
FIG. 5 is a graphical representation of an interface whereby participants in the presentation may select the next topic and propose a new topic for discussion during the presentation.

FIGS. 3-5 represent different examples of the interfaces that the participant can choose to provide feedback. A participant can use only one interface to provide feedback at specific time but can switch among the interfaces at any time. Similarly, a user can choose to use the interface in the presenter or participant mode, FIG. 3 230. When in the presenter mode, all the feedback buttons are inactive meaning that they cannot be used to provide feedback (to self), but they still capture and display feedback information from other participants.

FIG. 3 depicts an example of the interface that can be used when participants are providing feedback to the presenter, such as a teacher, while the presenter is speaking. Since this interface resembles the remote control, this is also referred to as a "remote." The remote is designed to be minimally disruptive to the participants so that they can focus on the presenter and the presentation itself and not on navigating the options on the remote. The remote can be implemented on different electronic devices such as on the smart phone or on the computer or a tablet. In this example, the remote consists of five buttons that convey the following information: (1) Button 1, 210, I'm lost, suggests that the participant doesn't understand the material; (2) Button 2, FF (Fast Forward), suggests that the presenter should go faster; for example, if the material is too simple; (3) Button 3, Great, suggests that everything is clear; (4) Button 4, REW (Rewind), suggests that the presenter is going too fast, and/or should go back and explain the material again; and (5) Button 5, Pause, suggests that the participant needs time to reflect. This is also a signal to the presenter to pause the lecture and allow participants to ask questions.

Within each button is the number that shows how many participants pressed that button. For example, for the button 1, 210, the number N1, 220, shows the number of participants that pressed that number. Overlapping with each circle around a button, there can be a thicker line that represents the percentage of the participants that have pressed the button. For example, the button 1 has a thicker line, 215, over the circle that shows that around 25% of the participants have pressed the button.

Figure 10:
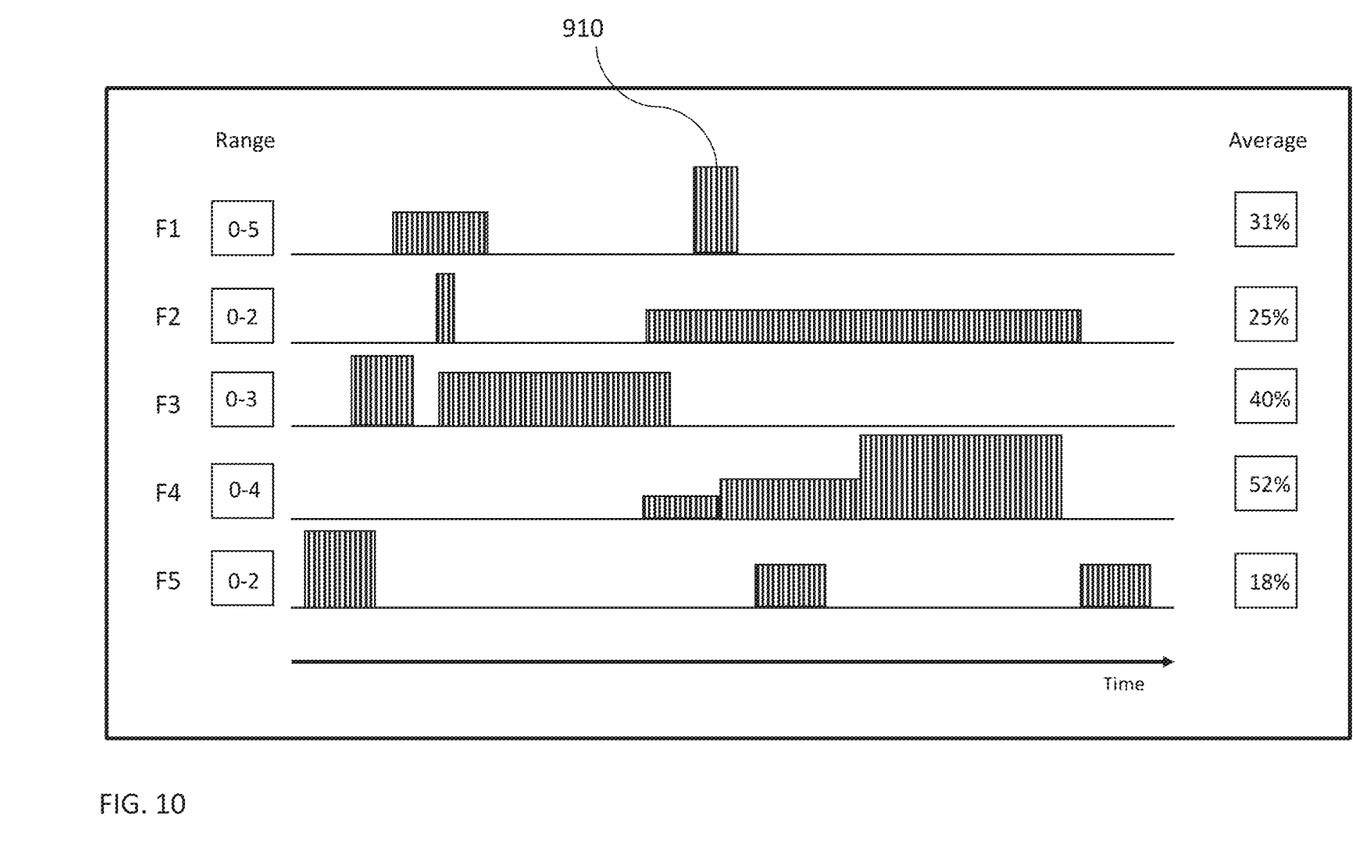
FIG. 10 is a graphical representation, illustrating another contemplated format for presenting feedback to a presenter.

Once a button on the remote is pressed, the numbers N1-5 within each button are updated in real time on every device if an option to publicly share feedback information has been enabled. Otherwise, the numbers N1-5 are visible only to the presenter. Feedback information is saved at selected time intervals (e.g., every second) and forms statistics as illustrated in FIG. 10.

FIG. 4 depicts an example of the interface that can be used to nominate the next speaker. The selection of the next speaker is generally done by the organizer and in response to participants that raised their hands indicating their desire to speak. However, in large meetings it is hard to keep track of the order in which hands were raised and in some situation a participant or a group of participants dominates a meeting despite the fact that other participants do not wish to hear from them. The present invention solves this and similar problems by allowing all the participants to select the speaker with a majority vote in real-time and anonymously.

In order to use this interface, it is assumed that there is a list of participants which can be created by the organizer, a minute taker or in other ways. As depicted in FIG. 4, the table contains the list of participants in the meeting and two checkboxes next to each name. One checkbox collects the votes for the participant to be the next speaker, and the other checkbox collects the votes against the participant to be the next speaker. For example, pressing the (−) checkbox, 310, for the participant Amy, would result in reducing the number of positive votes, 330, from 7 to 6, while pressing the checkbox (+), 320, would increase the number of positive votes, 330, from 7 to 8. At any time during the meeting, any participant can put a checkmark in any of the two checkboxes (but not in both). The total vote for each speaker, (as illustrated in circles next to check boxes) is calculated as the number of positive votes (+) minus the number of negative votes (−). The votes for each participant are updated in real-time and the names are ranked so that the participant that receives the highest net positive vote to be the next speaker is on the top. In this way, the organizer and all the participants can see who most of the participant propose as the next speaker.

FIG. 5 depicts an example of the interface that can be used to select among the existing agenda topics or to propose a new agenda topic.

As depicted in FIG. 5, the table contains the list of existing agenda topics and two checkboxes next to each topic. One checkbox collects the votes 420 that are in favor of the topic, and the other checkbox collects the votes 410 against the proposed topic. In this way, both the organizer and the participants can see what topics have the support and what topics don't have the support. The last line in the table, 430, shows an option for the participant to propose a new topic. Importantly, all the votes that the participants provide for and against proposed topics as well as proposals for the new topics are anonymous.

Before the meeting, an organizer registers with the platform and obtains an account that allows the organizer to login to the platform at any time. The organizer can schedule a meeting to start at a specific time and to end at a specific time. The organizer also has an option to upload presentation material for the meeting, such as slides or other media.

A meeting starts either when the organizer selects one of the pre-scheduled meetings and opens it, or if the organizer requests from the platform to generate a meeting at that point in time and open the meeting.

Figure 6:
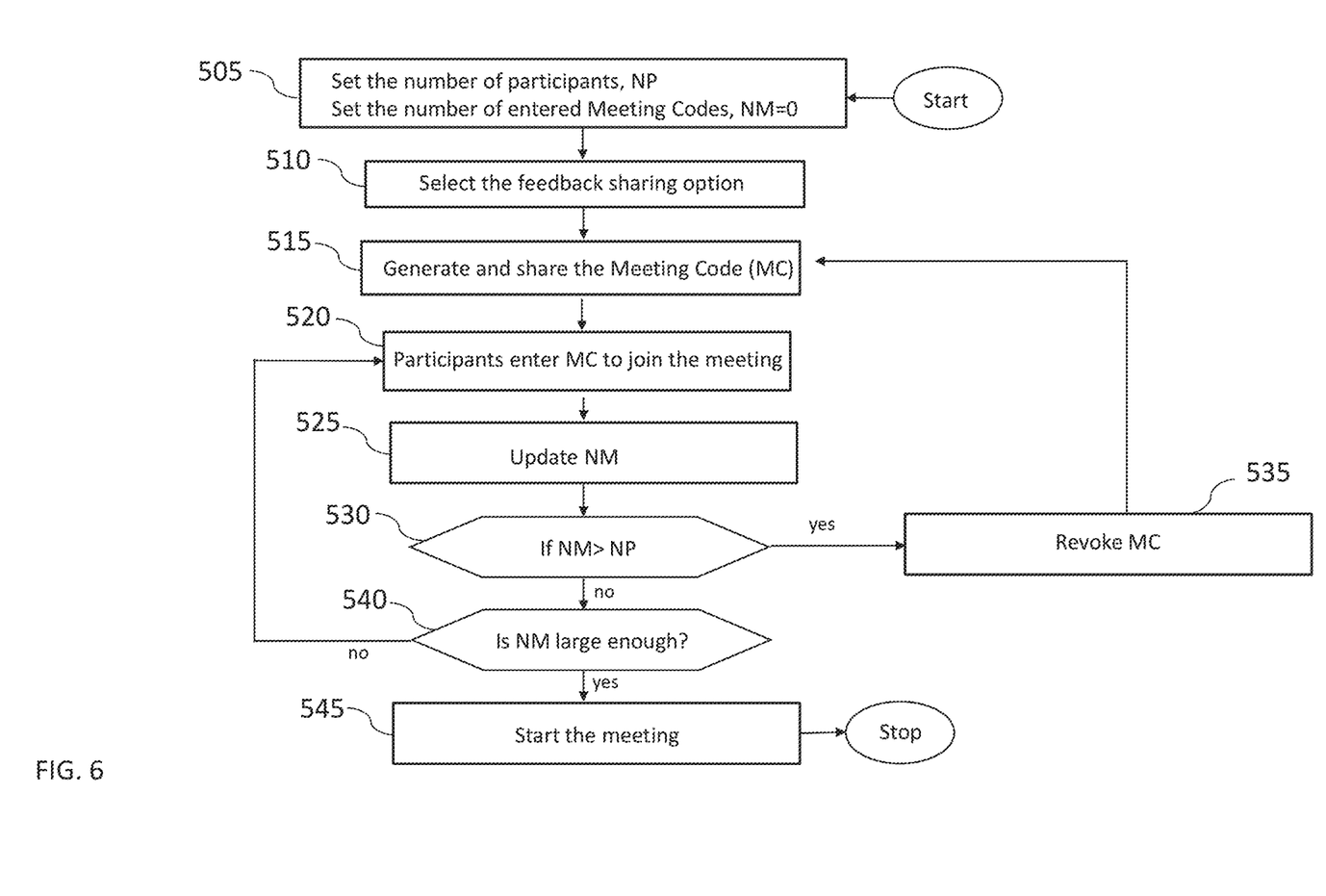
FIG. 6 is a flow chart providing one contemplated method for establishing and collecting selected parameters prior to the start of a presentation.

Referring to FIG. 6, at the beginning of the meeting, 505, the organizer enters the number of participants, NP that are present in the meeting. That number is the maximal number of participants that the organizer allows to participate. The variable NM counts how many participants entered the meeting code. The variable NM is initially set to zero and updated, 525, every time a new participant enters the meeting code (MC). The organizer has an option to choose whether feedback from the participants should be visible to everyone or just to the organizer when in the role of the presenter, 510. The organizer then requests the meeting code from the platform, 515. The platform generates the code, sends the code to the organizer and the organizer shares the code with participants.

The meeting code can consist of the string of numbers or the combination of numbers, letters, and special symbols. The meeting code can also be an image, or a group of images. The sharing of the meeting code can be conducted in different ways. For example, the organizer can orally share it with participants, or visually share it by way of showing the computer or a phone screen to the participants or drawing the entry-code on a board.

Once a participant enters a meeting code, 520, the participant is allowed to use the device and participate in the meeting. Since the participant does not enter his/her name, the platform does not know the identity of the participants and therefore every feedback is anonymous.

At every point in time, the organizer can see how many participants have entered the meeting code. If the code is entered more times than there are participants that are present in the meeting, 530, the organizer has an option to withdraw the permission to participants to use the remote, 535. The organizer can then request that the platform generates a new meeting code, 515, and share it with the participants. If the number of the participant that have entered the meeting code is too low, the organizer can encourage participants to enter the meeting code, 540. Once the number of the participants that entered the meeting code is sufficiently large, or equal to NP, the organizer can start the meeting, 545.

Figure 7:
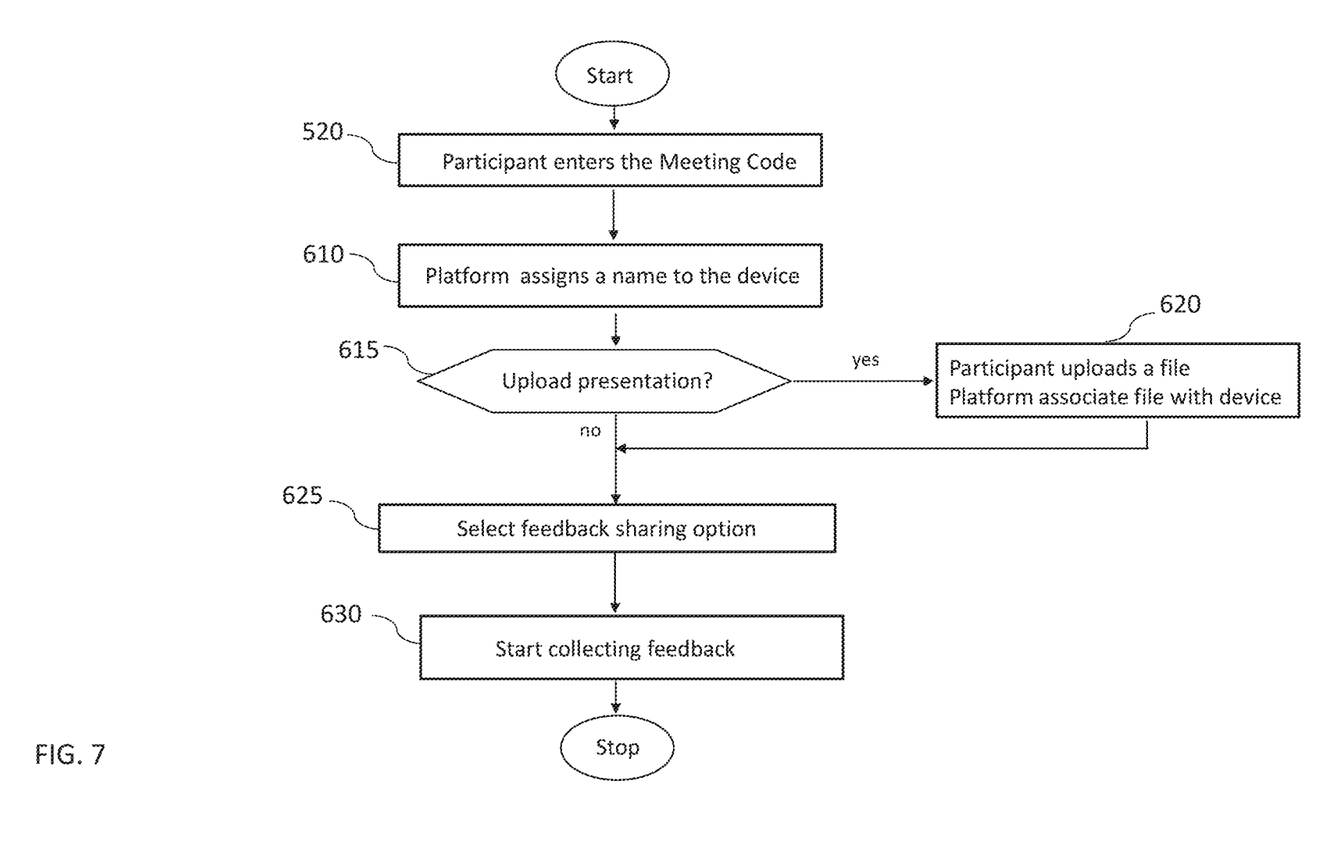
FIG. 7 is a flow chart providing a contemplated embodiment of a method for registering participants for a presentation.

FIG. 7 depicts the registration procedure from the point of view of the participants. Before the meeting starts, participants enter into their device the web address of the platform. Once the participants receive the meeting code, they enter it into their devices, 520. The platform then generates and assigns the name, 610, to each device from which it received the meeting code. Since during a meeting a participant can also become a speaker, each participant is offered to upload the presentation (such as the slides, or other media), 615. The participant has an option to select a file from their device and the platform then associate the file with their specific device, 620. The participant then selects the feedback sharing option, whether feedback from other participants should be visible to everyone or only to the participant when in the presenter role, 625. The participant's device is then ready to start collecting feedback from the participant, 630.

Figure 8:
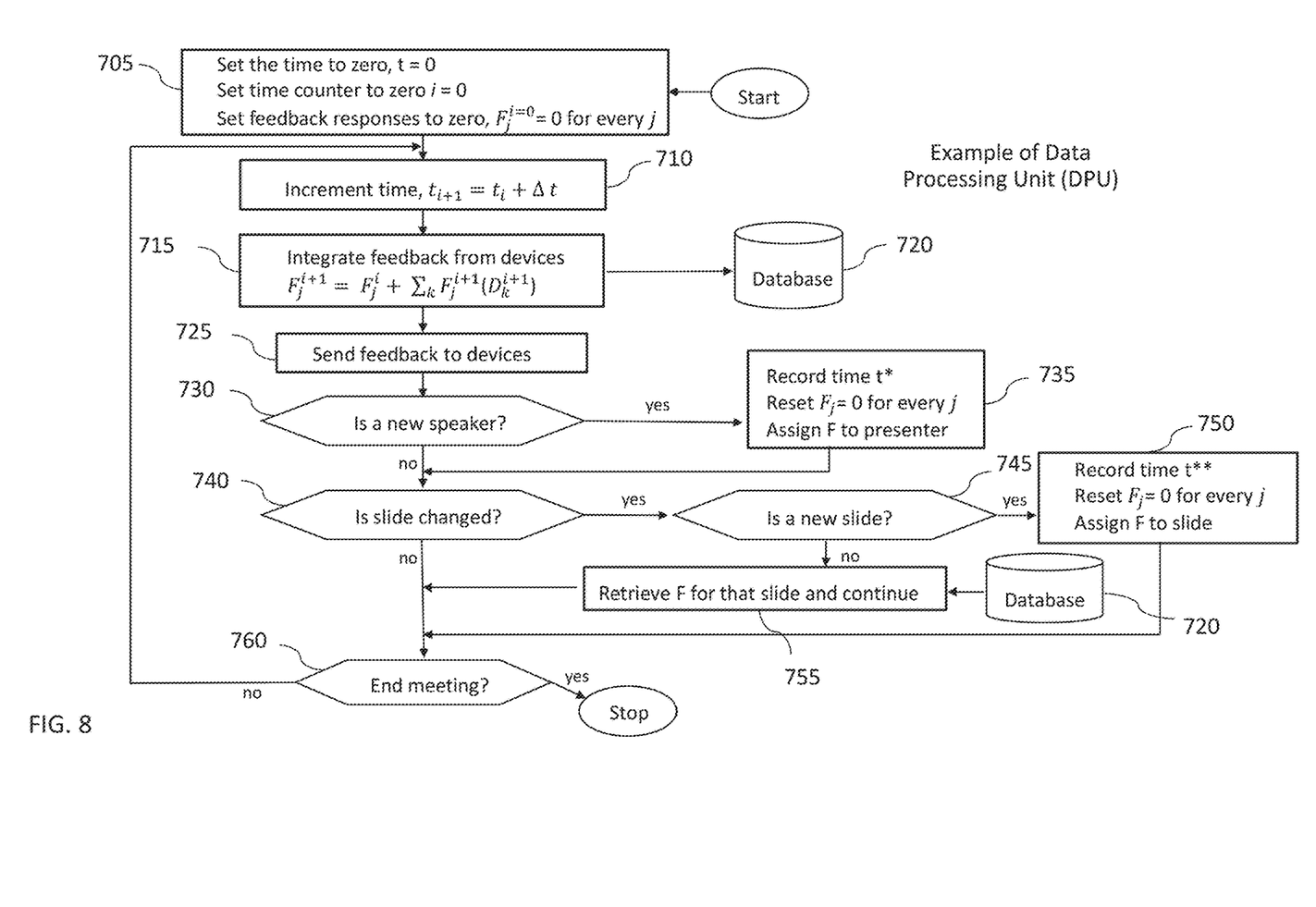
FIG. 8 is a flow chart illustrating one method for collecting and distributing feedback according to the present invention.

FIG. 8 depicts an embodiment of the present invention related to integration and processing of participants' feedback, 130 in FIG. 2, to the presenter while the presenter communicates to the participants using one of the modalities including slides, media (such as video) or is directly speaking to the audience. To provide feedback, the participants can use the interface illustrated in FIG. 3. The embodiment can be used during in-person or online meetings where there is only one presenter such as in lectures, or during conventional meetings where each participant at some point can become a presenter.

Participants' feedback is collected continuously over time and once the meeting starts the time is set to zero, 705. Since feedback is collected over a predetermined time interval, the time counter i is also set to zero, 705. For example,, can be set to 1 second and feedback is then collected over 1 second (see, e.g., 710). The variable denotes feedback response where the subscript denotes the number of feedback options, and the superscript counts time intervals. For example, in FIG. 3, there are 5 possible feedback responses so the variable j can take values from 1 to 5. All feedback responses are initially set to zero, 0 for every j, 705. The variable F can take two values: 0 if there is no response and 1 if there is response.

At every time step, and for every j, feedback is integrated from all the devices using equation in 715. The first term on the right-hand side,, denotes the j-th feedback at the i-th time step and the index k in the sum of the second term goes over all devices (over all participants that can provide feedback). For example, if there are 100 participants, the index k goes from 1 to 100. The j-th feedback from the k-th device at the (i+1)-th time step is represented as ( ) Each time feedback is calculated, 715, it is stored in the database, 720.

Every participant has an option to use a device in the participant or presenter mode. If at some time t* a new presenter is selected, 730, that time is recorded, all feedback responses are reset to zero, and feedback responses from that moment onward are assigned to the device of the new presenter, 735.

If the presenter is using slides and at time t changes a slide, 740, and switch to a new slide, 745, then the time t is recorded, all feedback responses are reset to zero, and feedback responses from that moment onward are assigned to the new slide, 750. If, however, the presenter at time t changes a slide, 740, and goes to the previously presented slide, e.g. the n-th slide, the time t is not recorded and feedback responses are not reset to zero. Instead, feedback responses associated with the n-th slide are retrieved, 755, from the database, 720, and the feedback collection is continued for that slide.

This process of collecting and processing feedback from participants is continued until the meeting ends, 760.

When a participant uploads the presentation, such as power point slides or a PDF presentation, it is parsed into separate pages so that feedback can be associated with each page/slide. Similarly, feedback may be provided for any of the visual materials selected for presentation. Visual materials include, but are not limited to slides and videos, as should be apparent to those skilled in the art. Alternatively, audio materials may be presented. Audio materials are contemplated to be encompassed by the present invention.

FIG. 9 depicts an example where feedback information, 725 from FIG. 8, is embedded into a slide. The bar at the bottom of the slide is divided into equal sections, where each section represents one feedback. If there is no feedback, such as for F5, 810, the section is empty. If feedback is provided, such as F1, then the portion of the section is filled, 820, and the length of the filled portion is proportional to the number of users that provided feedback while the portion of the section that remains empty, 830, is proportional to the number of participants that did not select that feedback option. This procedure of embedding feedback into media is nondisruptive and seamlessly integrated into presentation.

As illustrated in FIG. 8, at every time step, feedback information, 715, is sent to the database, 720, and stored. This information can be organized and visualized in different ways. FIG. 10 depicts a specific embodiment of the present invention for organizing and visualizing feedback information that uses histograms. Feedback information organized in this way also is referred to as "statistics."

If a presenter used slides, then the statistics depicted in FIG. 10 can refer to a specific slide. If a presenter gave a talk without using slides and instead just spoke to the audience, then the statistics in FIG. 10 represent participant feedback during the entire talk. If the presenter showed a video to the audience, then the statistics represent participants' feedback to the video.

After the meeting is over, the presenter can see how many participants, both the number of participants and a percentage of the participants, pressed each button and at what time. The left vertical axis in FIG. 10 shows the range of absolute responses, which means the minimal and maximal number of participants that have pressed a corresponding feedback button at specific time. For example, in the row that represents feedback F1, the range is from 0 to 5, and the height of the second histogram, 910, is 5 meaning that 5 participants pressed the button F1 at that time interval. The right vertical axis in FIG. 10 represents the percentages of participants that pressed the corresponding feedback buttons over the whole period of time the feedback information was collected. For example, this can be a period of time that the teacher used to describe a specific slide, or the duration of the whole talk.

The statistics can be presented at different resolutions which makes it easy for the user that is reviewing the statistics to quickly find relevant information and associate it at specific times of the presentation. For example, for a teacher that used slides, this would allow a teacher to identify the slides and locations within a slide where the students were not able to understand the material. Similarly, for a presenter that used a video, the statistics information would allow an easy way to localize sections of the video where the participants have difficulty understanding the content or found the content to simple.

In other contemplated embodiments, the presenter may receive haptic feedback that can be delivered through the smart watch, or smart phone or any other device. For example, a speaker can wear a belt and the stimulation on the right hip can signal feedback from the audience to speak faster while the stimulation on the left hip can signal feedback from the audience to speak slower. And yet the stimulation to the belly might signal feedback from the audience that they agree with the speaker and the stimulation on the back would signal that the audience does not agree with the speaker.

Participants provide feedback using an interface that can be implemented on different devices such as a smart phone, or a computer or a tablet. Importantly, the interface is contemplated to be easy to use and does not disrupt the participant from focusing on the presenter. For example, on the smart phone, the interface resembles the remote control but with only a few options so that the user does not even have to look at the phone in order to use it.

Taking the foregoing into account, the present invention is understood to encompass any of a number of methods, devices, and systems. Some of those methods, devices, and systems are summarized below.

In one or more contemplated embodiments, the present invention provides a method for collecting feedback 135 from at least one participant P1, P2, P3 during a presentation and for providing the feedback 155 to a first presenter 10. The method includes, by a data processing unit 140 connected to at least one participant device D1, D2, D3 associated with the at least one participant P1, P2, P3, setting a time increment $\Delta t$ for collecting feedback 135 from the at least one participant P1, P2, P3. At each time increment, feedback 135 that is provided by the at least one participant P1, P2, P3 via the at least one participant device D1, D2, D3 is collected by the data processing unit 140. The feedback 135 provided by the at least one participant P1, P2, P3 is then associated with each time increment by the data processing unit 140. The data processing unit 140 stores the feedback in a database 720 connected to the data processing unit 140. The feedback 135 is presented, via at least one presenter device D4 associated with the first presenter 10, to the first presenter 10.

In this method, the at least one participant P1, P2, P3 is understood to encompass a plurality of participants.

Similarly, the at least one participant device D1, D2, D3 is understood to encompass a plurality of participant devices.

Still further, the at least one participant device D1, D2, D3 is understood to be one of a computer, cellular telephone, or other mobile computing device.

Similarly, the at least one presenter device D4 is understood to be one of a computer, cellular telephone, or other mobile computing device.

In the method, it is contemplated that the at least one participant device D1, D2, D3 is connected wirelessly to the data processing unit 140.

In addition, for the method, the at least one presenter device D4 also is contemplated to be connected wirelessly to the data processing unit.

The method of the present invention also may include presenting the feedback 135 to the first presenter 10 in real time, during the presentation. (See, e.g., FIGS. 3 and 9.)

In addition, the method may include presenting a summary of the feedback to the presenter after the termination of the presentation. Here, the summary may include a histogram tabulating the feedback collected at each time increment. (See, e.g., FIG. 10.)

In another contemplated embodiment, the time increment is a predetermined time period. Here, the predetermined time period is contemplated to be at least one second.

In another contemplated embodiment, it is contemplated that the presentation includes a plurality of visual materials, presented serially, and that the time increment begins at a start of a display of each visual material from the plurality of visual materials. If so, the plurality of visual materials may be a plurality of slides and/or videos.

It is also contemplated that the method includes collecting, from the at least one participant device D1, D2, D3 via the data processing unit 140, second presenter input, identifying a second presenter, and by the data processing unit 140, changing the first presenter to the second presenter. (See, e.g., FIG. 4.)

Alternatively, the method also may include collecting, from the at least one participant device D1, D2, D3 via the data processing unit 140, second topic input, identifying a second topic, and by the data processing unit 140, sending the second topic input to the first presenter 10. (See, e.g. FIG. 5.)

The method of the present invention is contemplated to operate where an identity of the at least one participant P1, P2, P3 is anonymous.

The foregoing is not intended to be limiting of the present invention. As should be apparent to those skilled in the art, variations and equivalents of the embodiments may be employed without departing from the scope of the present invention. Those variants and equivalents are intended to be encompassed hereby as if described herein.

What is claimed is:

1. A method for collecting feedback from at least one participant during a presentation and for providing the feedback to a first presenter and to at least one other participant, comprising:
   by a data processing unit connected to at least one participant device associated with the at least one participant, setting a time increment for collecting the feedback from the at least one participant, wherein each time increment has the same interval;
   at each time increment, collecting, by the data processing unit, the feedback provided by the at least one participant via the at least one participant device;
   associating, by the data processing unit, the feedback provided by the at least one participant with each time increment;
   storing, by the data processing unit, the feedback in a database connected to the data processing unit for the time increment;
   presenting, via at least one presenter device associated with the first presenter, the feedback to the first presenter for each time increment, and
   presenting, via at least one other participant device associated with the at least one other participant, the feedback provided by the at least one participant for each time increment.

2. The method of claim 1, wherein:
   the at least one participant comprises a plurality of participants.

3. The method of claim 1, wherein the at least one participant device comprises a plurality of participant devices.

4. The method of claim 1, wherein the at least one participant device comprises one of a computer, cellular telephone, or other mobile computing device.

5. The method of claim 1, wherein the at least one presenter device comprises one of a computer, cellular telephone, or other mobile computing device.

6. The method of claim 1, wherein the at least one participant device is connected wirelessly to the data processing unit.

7. The method of claim 1, wherein the at least one presenter device is connected wirelessly to the data processing unit.

8. The method of claim 1, further comprising:
   presenting the feedback to the first presenter in real time, during the presentation.

9. The method of claim 1, further comprising:
   presenting a summary of the feedback to the presenter after the termination of the presentation.

10. The method of claim 9, wherein the summary comprises a histogram tabulating the feedback collected at each time increment.

11. The method of claim 1, wherein the time increment is a predetermined time period.

12. The method of claim 11, wherein the predetermined time period is at least one second.

13. The method of claim 1, wherein:
   the presentation comprises a plurality of visual materials, presented serially; and
   the time increment begins at a start of a display of each visual material from the plurality of visual materials.

14. The method of claim 13, wherein the plurality of visual materials comprises a plurality of slides.

15. The method of claim 13, wherein the plurality of visual materials comprises a plurality of videos.

16. The method of claim 1, further comprising:
   collecting, from the at least one participant device via the data processing unit, second presenter input, identifying a second presenter; and
   by the data processing unit, changing the first presenter to the second presenter.

17. The method of claim 1, further comprising:
   collecting, from the at least one participant device via the data processing unit, second topic input, identifying a second topic; and
   by the data processing unit, sending the second topic input to the first presenter.

18. The method of claim 1, wherein an identity of the at least one participant is anonymous.

19. The method of claim 1, wherein:
   the time increment comprises a plurality of time increments.

* * * * *